United States Patent [19]

Teramachi

[11] Patent Number: 4,629,337
[45] Date of Patent: Dec. 16, 1986

[54] BALL SPLINE BEARING

[76] Inventor: Hiroshi Teramachi, 2-34-8, Higashi-Tanagawa, Setagaya-Ku, Tokyo, Japan

[21] Appl. No.: 829,551

[22] Filed: Feb. 13, 1986

Related U.S. Application Data

[63] Continuation of Ser. No. 536,274, Sep. 27, 1983, abandoned.

[30] Foreign Application Priority Data

Jan. 29, 1983 [JP] Japan .................................. 58-12140

[51] Int. Cl.$^4$ ............................................. F16C 29/06
[52] U.S. Cl. ...................................................... 384/43
[58] Field of Search ............... 308/6 C, 6 R; 464/168, 464/167

[56] References Cited

U.S. PATENT DOCUMENTS

| | | | |
|---|---|---|---|
| 2,945,366 | 7/1960 | Sears | 308/6 C X |
| 4,127,309 | 11/1978 | Teramachi | 308/6 C |
| 4,165,195 | 8/1979 | Teramachi | 308/6 C X |
| 4,309,061 | 1/1982 | Teramachi | 308/6 C |

Primary Examiner—Stuart S. Levy
Assistant Examiner—Thomas R. Hannon
Attorney, Agent, or Firm—Kenyon & Kenyon

[57] ABSTRACT

A ball spline bearing has an outer sleeve provided with a plurality of load-carrying ball grooves formed in the inner peripheral surface thereof at a predetermined circumferential pitch so as to extend in the axial direction thereof, and a plurality of unloaded ball passages formed in the solid part thereof at a predetermined circumferential pitch so as to extend in the axial direction of the same. The outer sleeve has a hollow which receives a spline shaft which is provided in the outer peripheral surface thereof with a plurality of load-carrying ball grooves, the load-carrying ball grooves in the outer sleeve and the load carrying ball grooves in the spline shaft opposing to each other to form therebetween load-carrying ball passages. A pair of side covers are attached to both open ends of the outer sleeve. Each of the side cover is provided in the inner surface thereof with a plurality of ball turning grooves which interconnect the load-carrying ball passages to corresponding unloaded ball passages so that the outer sleeve, the spline shaft and the side covers in cooperation form a plurality of ball recirculation passages. A plurality of ball trains each consisting of a multiplicity of balls are loaded in corresponding ball recirculation passages.

4 Claims, 16 Drawing Figures

FIG.10
FIG.11
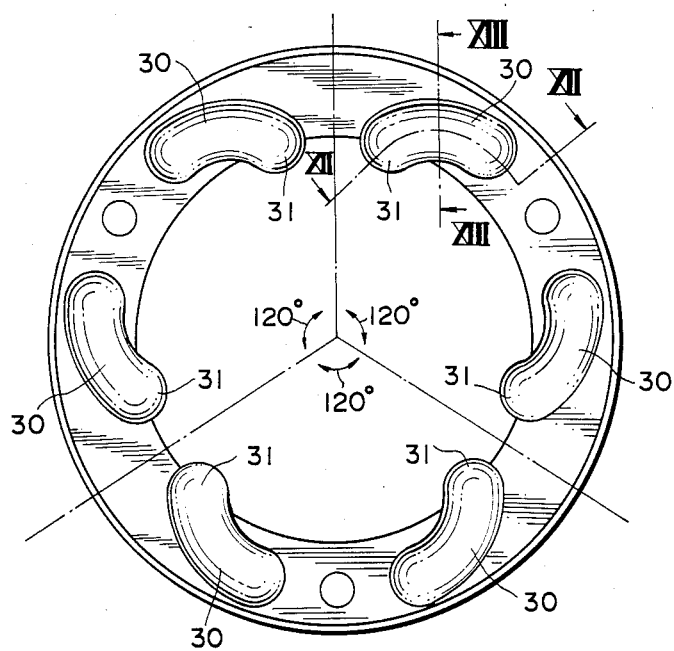
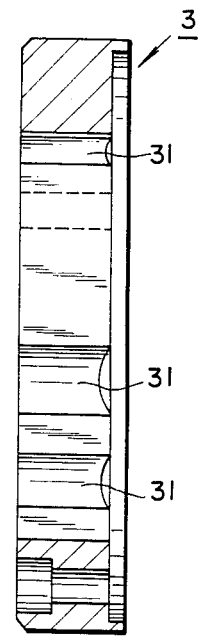
FIG.12
FIG.13
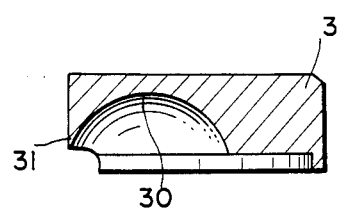
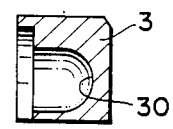

BALL SPLINE BEARING

This application is a continuation, of application Ser. No. 536,274, filed Sept. 27, 1983 now abandoned.

BACKGROUND OF THE INVENTION

The present invention relates to a ball spline bearing for use in bearing a load which moves in the axial direction and/or in the rotational direction.

As shown in FIGS. 14 and 15 showing a prior art, a typical conventional ball spline bearing has an outer sleeve 100, a spline shaft 101 and a ball retainer 102 interposed between the outer sleeve 100 and the spline shaft 101. The ball retainer 102 has a plurality of axial slits 103 receiving a multiplicity of torque-transmitting loaded balls 104 adapted to roll along these slits 103. In this conventional ball spline bearing, the angle $\theta$ at which each ball 104 contacts the loaded ball grooves 105 and 106 in the outer sleeve 100 and the spline shaft 101, i.e. the angle formed between a line X—X interconnecting the center O of the outer sleeve 100 and the center O' of the ball 104 and a line Y—Y interconnecting the points $p_1$ and $p_2$ of contact of the ball 104 with the loaded ball grooves 105 and 106, is about 30°, so that the load bearing capacity or torque transmitting capacity of the ball spline bearing is limited undesirably. In addition, the necessity of the ball retainer 102 disposed between the outer sleeve 100 and the spline shaft 101 inconveniently increases the number of parts to raise the cost of production of the ball spline bearing and to complicate the process of assembling unfavourably.

SUMMARY OF THE INVENTION

Under this circumstance, the present invention aims at obviating the above-described problems of the prior art.

Accordingly, it is a primary object of the invention to provide a ball spline bearing in which the ball retainer essential in the conventional ball spline bearing is omitted to increase the load bearing capacity or the torque transmitting capacity, while reducing the production cost and simplifying the process of assembling of the ball spline shaft.

To this end, according to the invention, there is provided a ball spline bearing comprising: an outer sleeve having a plurality of load-carrying ball grooves formed in the inner peripheral surface thereof at a predetermined circumferential pitch so as to extend in the axial direction thereof, and a plurality of unloaded ball passages formed in the solid part thereof at a predetermined circumferential pitch so as to extend in the axial direction thereof; a spline shaft received by the hollow of the outer sleeve and provided in the outer peripheral surface thereof with a plurality of load-carrying ball grooves, the load-carrying ball grooves in the outer sleeve and the load-carrying ball grooves in the spline shaft opposing to each other to form therebetween load-carrying ball passages; a pair of side covers attached to both open ends of the outer sleeve, each of the side cover being provided in the inner surface thereof with a plurality of ball turning grooves which interconnect the load-carrying ball passages to corresponding unloaded ball passages so that the outer sleeve, the spline shaft and the side covers in cooperation form a plurality of ball recirculation passages; and a plurality of ball trains each consisting of a multiplicity of balls and loaded in corresponding ball recirculation passages.

The above and other objects, features and advantages of the invention will become clear from the following description of the preferred embodiment taken in conjunction with the accompanying drawings.

BRIEF DESCRIPTION OF THE DRAWINGS

FIG. 3 is a sectional view taken along the line III—III of FIG. 1a;

FIG. 10 is a rear elevational view of the side cover showing the inner shape thereof;

FIG. 11 is a sectional view taken along the line XI—XI of FIG. 9;

FIG. 12 is a sectional view taken along the line XII—XII of FIG. 10;

FIG. 13 is a sectional view taken along the line XIII—XIII of FIG. 10; and

DESCRIPTION OF THE PREFERRED EMBODIMENT

Figure 1:
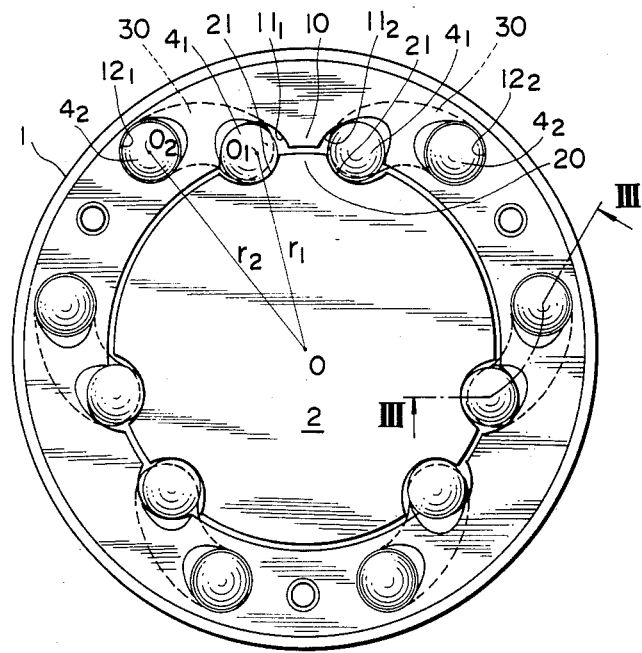
FIG. 1a is a front elevational view of a ball spline shaft embodying the present invention with one of the side covers thereof detached.
FIG. 1b is an enlarged view of a part of the ball spline bearing as shown in FIG. 1 b.
Figure 1:
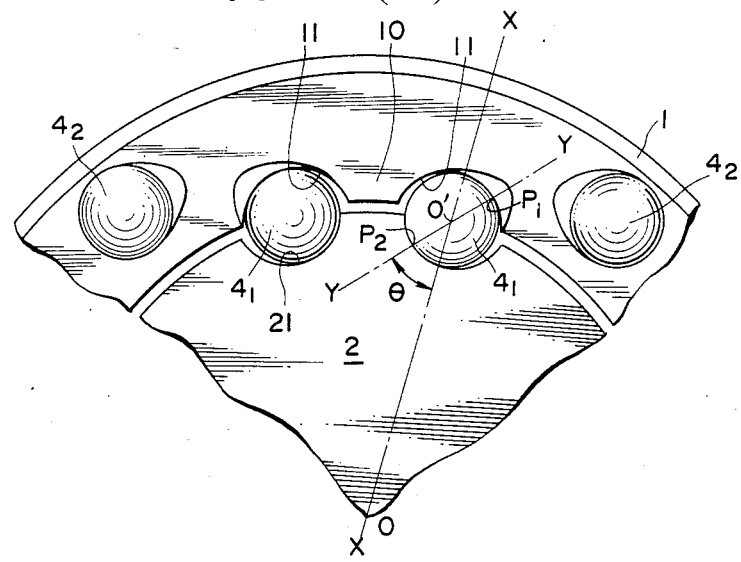
Figure 2:
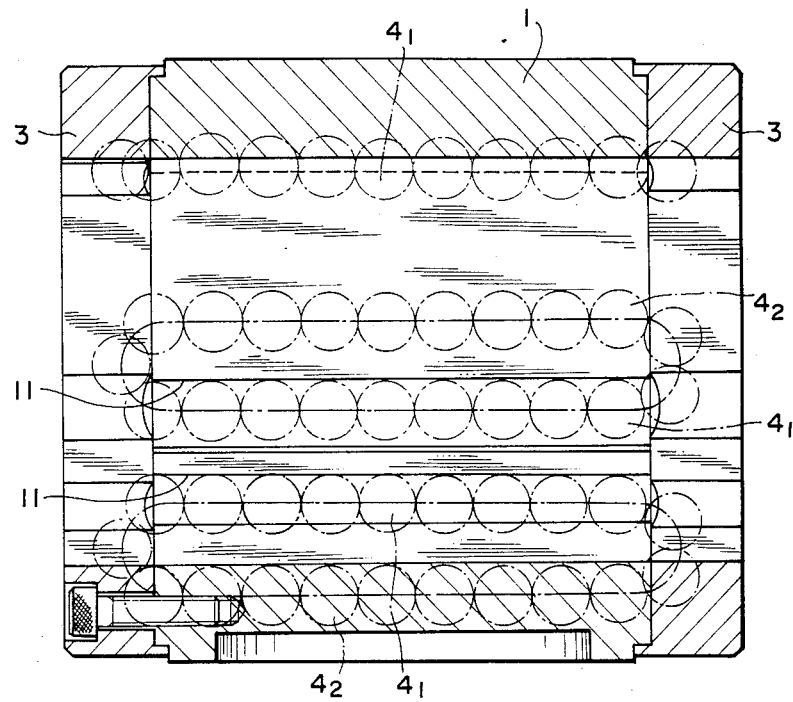
FIG. 2 is a sectional side elevational view of the ball spline bearing taken along the longitudinal axis thereof with a spline shaft removed to clarify the illustration.
Figure 3:
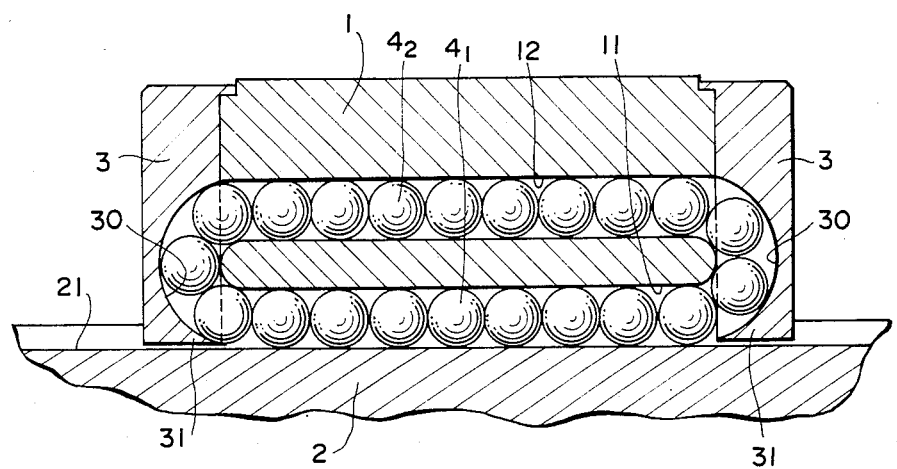
Figure 4:
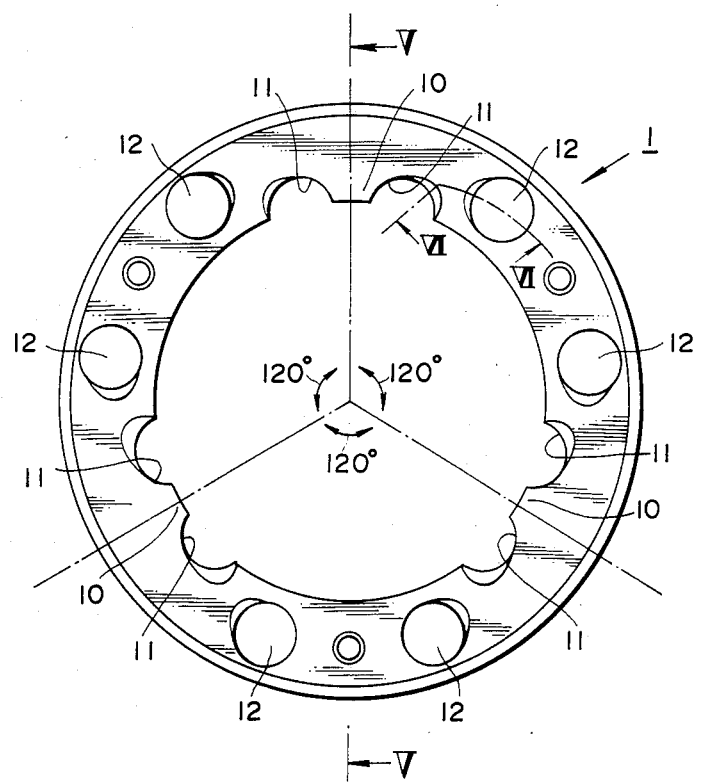
FIG. 4 is a front elevational view of an outer sleeve.
Figure 5:
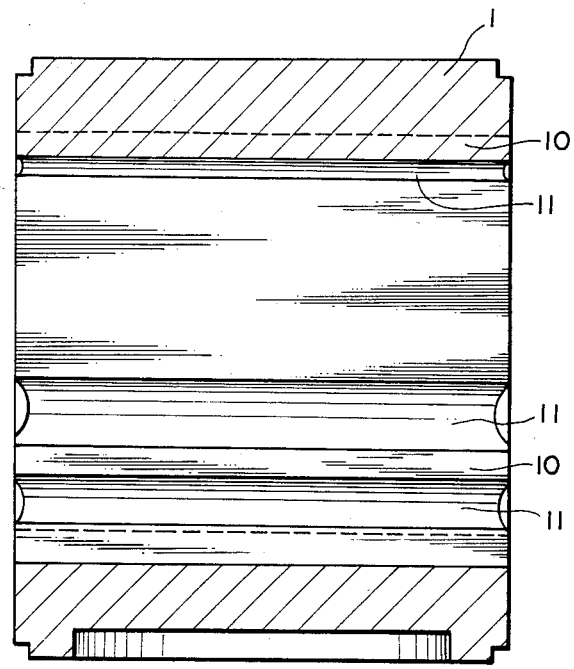
FIG. 5 is a sectional side elevational view of the outer sleeve taken along the longitudinal axis thereof.
Figure 6:
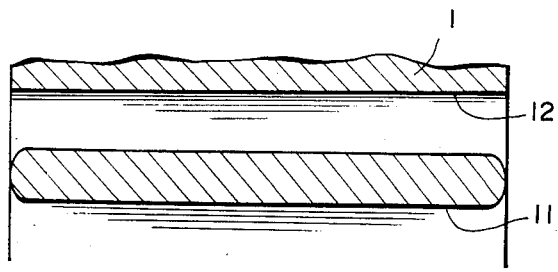
FIG. 6 is a sectional view taken along the line VI—VI of FIG. 4.

A preferred embodiment of the invention will be described hereinunder with reference to the accompanying drawings.

A ball spline bearing in accordance with the invention basically has an outer sleeve 1, a spline shaft 2 received by the outer sleeve 1, side covers 3 attached to both open ends of the outer sleeve 1 and ball trains 4 each consisting of a multiplicity of balls adapted to be recirculated through passages presented by a cooperation between the outer sleeve 1 and the spline shaft 2. To explain in more detail, as shown in FIGS. 1 to 6, the outer sleeve 1 is composed of a cylindrical member of a quench-hardenable material and is provided on the inner peripheral surface thereof with three axial partition banks 10 formed at 120° interval. Semicircular loaded ball grooves 11,11 are formed in the inner peripheral surface of the outer sleeve 1 at both sides of each partition bank 10 in symmetry with respect to the radial center line of the partition bank 10. Consequently, three pairs, i.e. 6 (six) in all, of axially extending loaded ball grooves 11 are formed in the inner peripheral surface of the outer sleeve 1. The cross-section of each loaded ball groove 11 has a curvature which is selected to be greater than the curvature of the ball surface. By such an arrangement, the contact of area between the loaded ball and the groove surface due to elastic deformation of the ball surface and groove surface is increased to reduce the load to be born by unit area, so that the load bearing capacity of the ball spline bearing as a whole is increased conveniently.

The outer sleeve 1 is provided with 6 (six) unloaded ball passages 12 formed in the solid portion thereof so as to extend axially at a predetermined circumferential pitch. In order to facilitate the rolling of the balls, each of the unloaded ball passages has a diameter slightly greater than the ball diameter. The unloaded ball passages 12 are disposed at both sides of each partition bank 10 at the outer sides of the load-carrying ball grooves in symmetry with respect to the partition bank 10.

An explanation will be made hereinunder, with specific reference to FIG. 1, as to how the load-carrying ball passages 11 and the unloaded ball passages 12 correspond to each other. In order to simplify the explanation, a reference is made exemplarily to one of the partition banks 10 which is disposed at the upper central portion of the outer sleeve 10 as viewed in FIG. 1. The load-carrying ball groove $11_1$ located at the left side of the partition bank 10 and the unloaded ball passage $12_1$ located at the left side of the same constitute, in combination with each other, a complete ball recirculation passage. Similarly, the load-carrying ball groove $11_2$ and the unloaded ball passage $12_2$ located at the right side of the partition bank 10 in combination constitute another ball recirculation passage.

On the other hand, the following positional relationship exists between the centers $O_1$ and $O_2$ of the load-carrying ball groove 11 and the unloaded ball passage 12 and the center O of the outer sleeve 1. Representing the radial distances of the centers $O_1$ and $O_2$ from the center O of the outer sleeve by $r_1$ and $r_2$, respectively, these radial distances or radii are selected to meet the condition of $r_1 < r_2$. The difference R ($R = r_2 - r_1$) between these radii is selected to be smaller than the ball diameter, so that the unloaded ball passage 12 can be located at a position which is comparatively close to the center O of the outer sleeve 1 in relation to the position of the load-carrying ball groove 11. Consequently, the influence of the centrifugal force on the balls $4_2$ in the unloaded ball passage 12 during the rotation of the outer sleeve 1 can be diminished advantageously thereby to ensure a smooth running of the balls.

Figure 7:
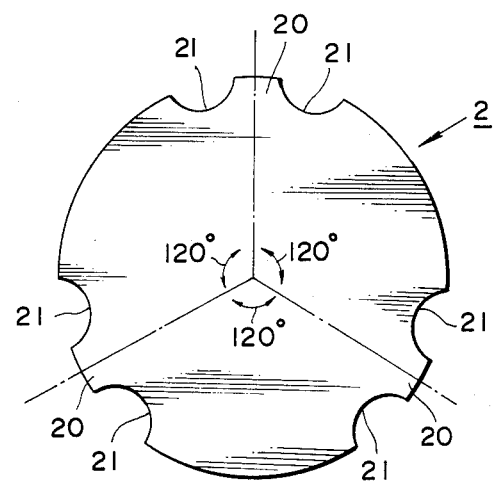
FIG. 7 is a front elevational view of a spline shaft.
Figure 8:
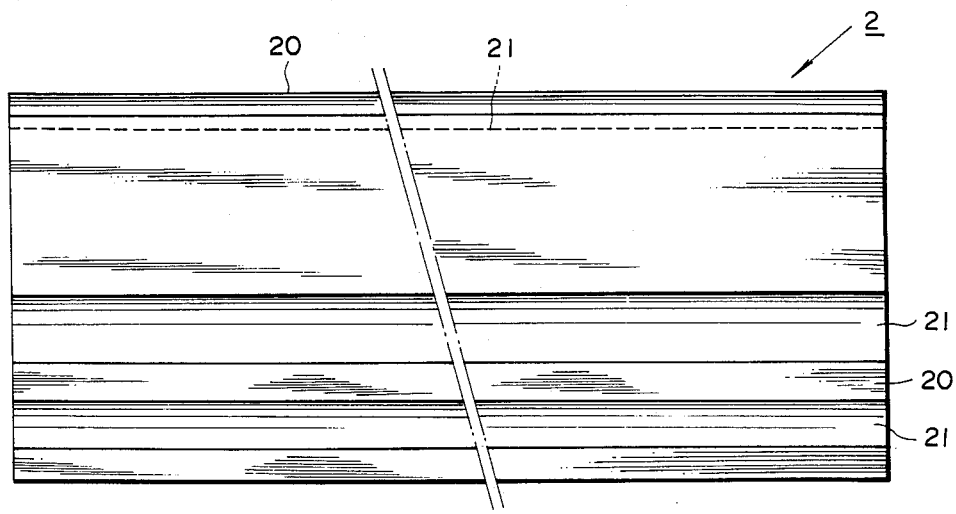
FIG. 8 is a side elevational view of the spline shaft.
Figure 9:
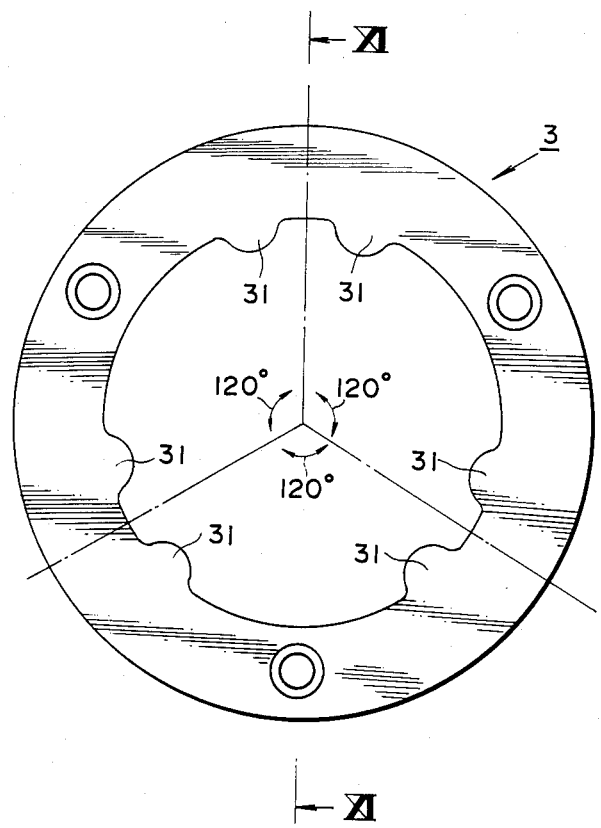
FIG. 9 is a front elevational view of a side cover showing the outer appearance of the same.
Figure 14:
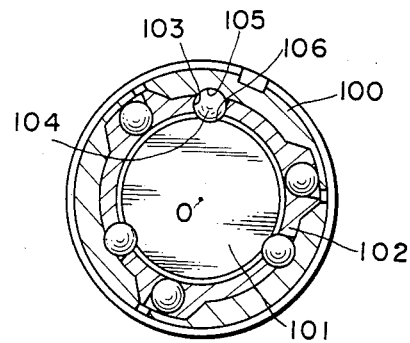
FIGS. 14 and 15 are diagrammatic illustrations of a conventional ball spline bearing.
Figure 15:
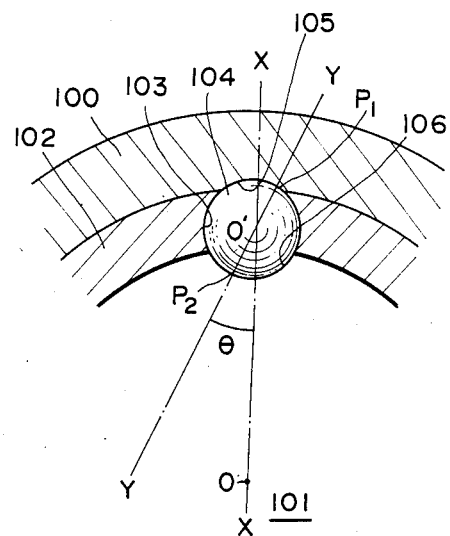

As shown in FIGS. 1, 7 and 8, the spline shaft 2 having a substantially circular cross-section and received by the hollow of the outer sleeve 1 has an outer peripheral configuration which conforms with the inner peripheral configuration of the outer sleeve 1. Namely, the spline shaft 2 is provided on the outer peripheral surface thereof with partition banks 20 corresponding to those 10 on the outer sleeve 1, formed at a constant circumferential pitch which is in this case 120°. Load-carrying ball grooves 21,21 each having a semi-circular cross-section is formed at both sides of each partition bank 20 in symmetry with respect to the radial center line of the partition bank 20. Thus, in the described embodiment, three pairs, i.e. 6 (six), of load-carrying ball grooves 21 are formed in the outer peripheral surface of the spline shaft 2 so as to extend in the axial direction of the latter. Thus, the load-carrying ball grooves 11 in the outer sleeve 1 and corresponding load-carrying ball grooves 12 in the spline shaft 2 in cooperation present 6 (six) passages for load-carrying balls. The load-carrying ball groove 21 in the spline shaft 2 has a curvature greater than the curvature of the ball 4, as in the case of that of the load-carrying ball groove in the outer sleeve 1.

The load-carrying ball passages each constituted by a loaded-ball carrying grooves 11 and 21 are charged with respective trains of balls 4 which are made of steel. In the ball spline bearing of the invention, each of the load-carrying ball grooves 11 and 12 can have a sufficiently large depth, e.g. about a half of the ball diameter as shown in FIG. 1. Consequently, it is possible to obtain a large value, e.g. about 45°, of the aforementioned angle $\theta$ of contact between the ball 4 and the load-carrying ball grooves 11 and 21.

The front and rear side covers 3,3 arranged in a pair are attached to both axial open ends of the outer sleeve 1. These side covers 3 are made by moulding from a synthetic resin or precision casting or die casting. As shown in FIGS. 1 to 3 and FIGS. 9 to 13, each side cover 3 is provided in the inner surface thereof with a plurality of ball turning grooves 30 which connects the ends of the load-carrying ball passages each constituted by the grooves 11,21 to the ends of the corresponding unloaded ball passages 12. Thus, the balls coming out of the load-carrying ball passages 11,21 are forcibly turned as they roll along the ball turning grooves 30 and are then introduced into the unloaded ball passages 12. Similarly, at the other end of the outer sleeve 1, the ball turning grooves 30 serve to guide the balls from the unloaded ball passages 12 into the load-carrying ball passages 11,21. A reference numeral 31 denotes tongues which are formed on the ends of respective ball turning grooves 30 adjacent to the load-carrying ball passages 11,21. These tongues 31 effectively scoop the balls 4 running out of the load-carrying ball grooves 11,21 and direct the same smoothly into the ball turning grooves 30 without fail.

The ball spline bearing of the invention having the described construction operates in a manner explained hereinunder. As the outer sleeve 1 or the spline shaft 2 is moved axially while being rotated, the loaded balls 4 serving as torque-transmitting members run in the axial direction of the outer sleeve 1 while making a perfect rolling contact with the surfaces of the loaded ball passages 11,21. The balls 4 are successively scooped by the tongues 31 on the side covers 3 and introduced into respective ball turning grooves 30. Thus, the load-carrying balls 4 running linearly are unloaded and turned as they run along the ball turning grooves 30 and are introduced into the unloaded ball passages 12. The unloaded balls 4 running in the unloaded ball passages 12 are then turned by the ball turning grooves 30 at the other end of the outer sleeve 1 and are recirculated into the load-carrying ball passages 11,21. Thus, the balls 4 are repeatedly circulated in trains through the load-carrying ball passages 11,21 and the unloaded ball passages 12. It will be seen that each ball serves as the load-carrying ball when it runs along the load-carrying ball passage 11,21 and behaves as the unloaded ball when it runs along the unloaded ball passage 12.

As will be understood from the foregoing description, the ball spline bearing in accordance with the invention is devoid of the ball retainer which is essential in the conventional ball spline bearing. In the ball spline bearing of the invention, the load-carrying ball grooves formed in the inner peripheral surface of the outer sleeve and the load-carrying ball grooves in the outer peripheral surface of the spline shaft are arranged to directly oppose to each other to define load-carrying ball passages therebetween. With this arrangement, it is possible to preserve a large depth of each of the opposing load-carrying ball grooves and, hence, to make the angle of contact between the ball and the surfaces of the load-carrying ball grooves take a large value of about 45°, so that the load carrying capacity or the torque transmitting capacity of the ball spline bearing is improved remarkably.

Therefore, according to the invention, it is possible to reduce the diameters of the outer spline and the spline shaft without being accompanied by any decrease in the load carrying capacity or the torque transmission capacity.

It will be understood that the present invention provides a compact ball spline bearing having sufficiently large load carrying or torque transmitting capacity. Such compact ball spline bearing, when used in a rotary part of an industrial robot, permits the design and construction of a small-sized robot having a large output power.

In addition, the elimination of the ball retainer reduces the number of parts of the ball spline bearing, which not only lowers the production cost but also facilitates the assembling of the ball spline bearing to further reduce the production cost. The elimination of the ball retainer offers another advantage that, since the weight of the ball spline bearing as a whole is decreased, the force of inertia is diminished when the outer sleeve or the spline shaft is abruptly started or stopped during high-speed operation of the machine incorporating this ball spline bearing. Thus, the ball spline bearing of the invention is suitable for use in machines which are required to operate at a high speed.

Although the invention has been described through specific terms, it is to be noted here that the described embodiment is not exclusive and various changes and modifications may be imparted thereto without departing from the scope of the invention which is limited solely by the appended claims.

What is claimed is:

1. In a ball spline bearing comprising:

an axially extending outer sleeve having a circumferential solid part surrounding a hollow center region with said solid circumferential part having an inner peripheral surface facing the hollow center region, said outer sleeve having a plurality of partition banks formed in the inner peripheral surface thereof at a predetermined circumferential pitch and extending in the axial direction thereof, said outer sleeve being provided at the opposite sides of each of said partition banks with a pair of axially extending load-carrying ball grooves, said outer sleeve further having a plurality of axially extending unloaded ball passages formed in the solid part thereof;

a spline shaft having an outer peripheral surface received by the hollow of said outer sleeve and provided in the outer peripheral surface thereof with a plurality of load-carrying ball grooves, said load-carrying ball grooves in said outer sleeve and said load-carrying ball grooves in said spline shaft opposing to each other to form therebetween load-carrying ball passages;

a pair of side covers attached to both open ends of said outer sleeve, each said side cover having an inner surface adjacent said sleeve with each inner surface being provided with a plurality of ball turning grooves which interconnected said load-carrying ball passages to corresponding unloaded ball passages so that said outer sleeve, said spline shaft and said side covers in cooperation form a plurality of ball recirculation passages; and a plurality of ball trains each comprising a multiplicity of balls disposed in and adapted to recirculate through the corresponding ball recirculation passage the improvement wherein said unloaded ball passages in said outer sleeve are circumferentially spaced apart from the related load-carrying ball passages so as to be disposed near the tangential lines on the inner peripheral surface of said outer sleeve passing the axes of the related load-carrying ball passages; the difference between the radial distance from the axis of said outer sleeve to the axis of each of said unloaded ball passages and the radial distance from the axis of said outer sleeve to the axis of each of said load-carrying ball passages is less than the diameter of each ball; and said ball turning grooves in said side covers are each curved so as to provide a smooth turning of balls which move from said load-carrying ball passages to said unloaded ball passages or vice versa.

2. A ball spline bearing according to claim 1, wherein the angle of contact between the surface of the load-carrying ball and the surface of said load-carrying ball grooves is selected to be about 45°.

3. A ball spline bearing according to claim 2 wherein each of said ball turning grooves in each of said side cover is provided at its one end with a tongue.

4. A ball spline bearing according to claim 1 wherein each of said ball turning grooves in each of said side cover is provided at its one end with a tongue.

* * * * *